United States Patent [19]

Bougard et al.

[11] Patent Number: 5,478,545
[45] Date of Patent: Dec. 26, 1995

[54] PROCESS FOR USING REACTIONS OF GAS/SOLID TYPE IN WHICH THE SOLID REACTANT CONTAINS AN AT LEAST PARTIALLY HYDRATED SALT

[75] Inventors: Jacques D. F. G. Bougard; Roger H. E. Jadot, both of Mons, Belgium

[73] Assignee: Elf Aquitaine, France

[21] Appl. No.: 222,238

[22] Filed: Apr. 4, 1994

[30] Foreign Application Priority Data

Apr. 2, 1993 [FR] France ................... 93 03918

[51] Int. Cl.$^6$ .................... C01B 9/02; C01B 17/96; C01B 25/26
[52] U.S. Cl. .................... 423/308; 423/311; 423/312; 423/491; 423/497; 423/544; 423/548; 423/659
[58] Field of Search .................... 423/659, 308, 423/311, 312, 491, 497, 544, 548

[56] References Cited

U.S. PATENT DOCUMENTS

| | | | |
|---|---|---|---|
| Re. 34,259 | 5/1993 | Rockenfeller | 62/4 |
| 3,347,626 | 3/1965 | Nightingale, Jr. | 23/91 |
| 3,454,357 | 7/1969 | Rhees et al. | 423/659 |
| 4,848,994 | 7/1989 | Rockenfeller | 62/4 |
| 4,906,258 | 3/1990 | Balat et al. | 55/74 |
| 4,944,159 | 7/1990 | Crozat | 62/112 |
| 5,056,591 | 10/1991 | Spinner et al. | 165/104 |
| 5,298,231 | 3/1994 | Rockenfeller | 423/659 |

FOREIGN PATENT DOCUMENTS 327482  4/1930  United Kingdom .

*Primary Examiner*—Wayne Langel
*Attorney, Agent, or Firm*—Bacon & Thomas

[57] ABSTRACT

Process for using reactions of gas/solid type in which the solid reactant contains an at least partially hydrated salt.

The process makes it possible to shift the position of the equilibrium line of the reaction under consideration and to reduce its slope in a Clapeyron diagram so as to cover a wider temperature region for a limited pressure range.

9 Claims, 6 Drawing Sheets

FIG_1

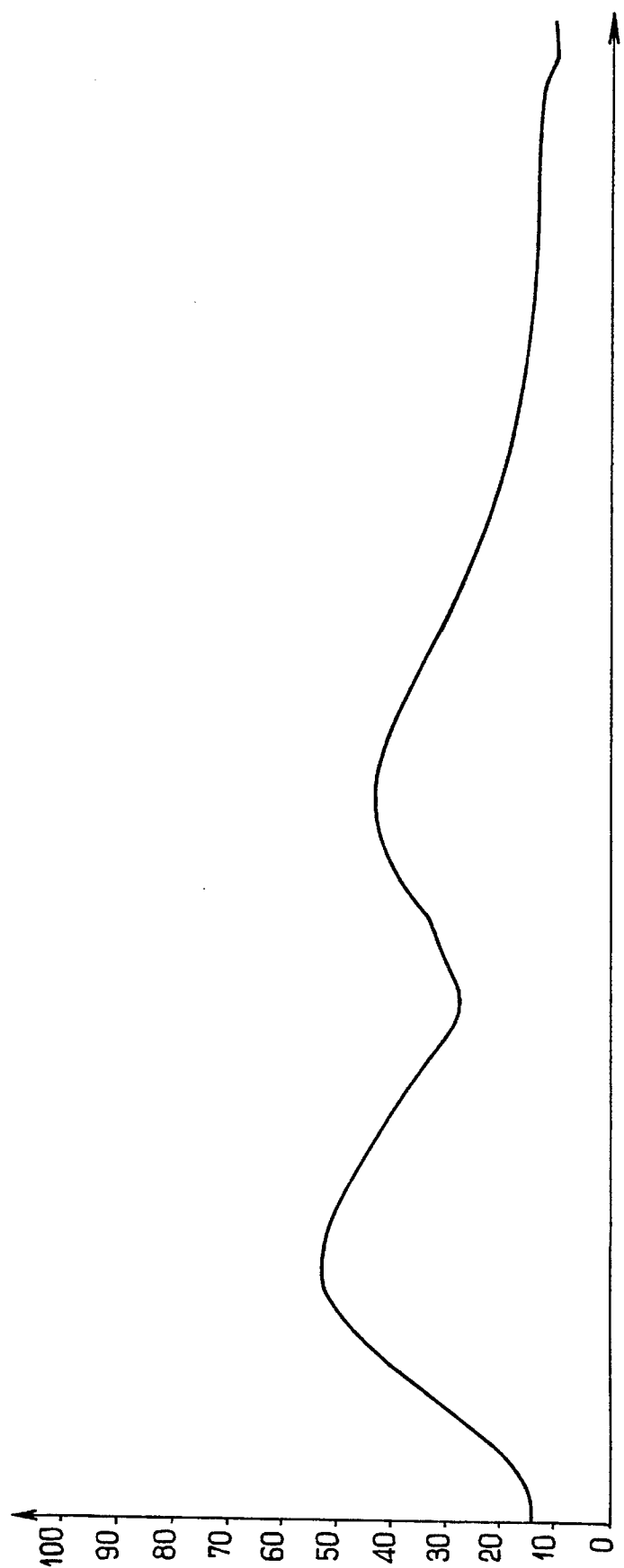
FIG._3

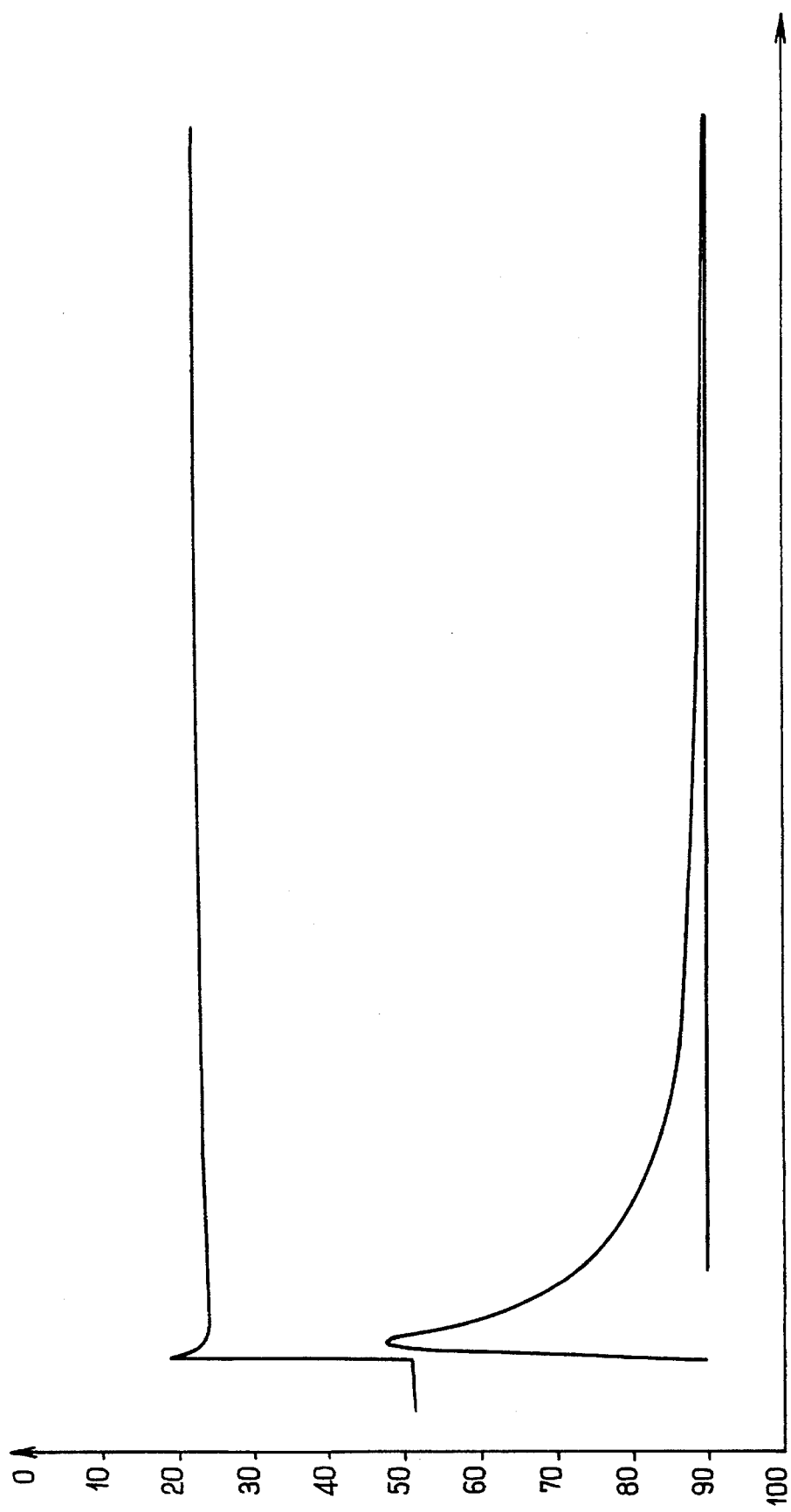
FIG._4

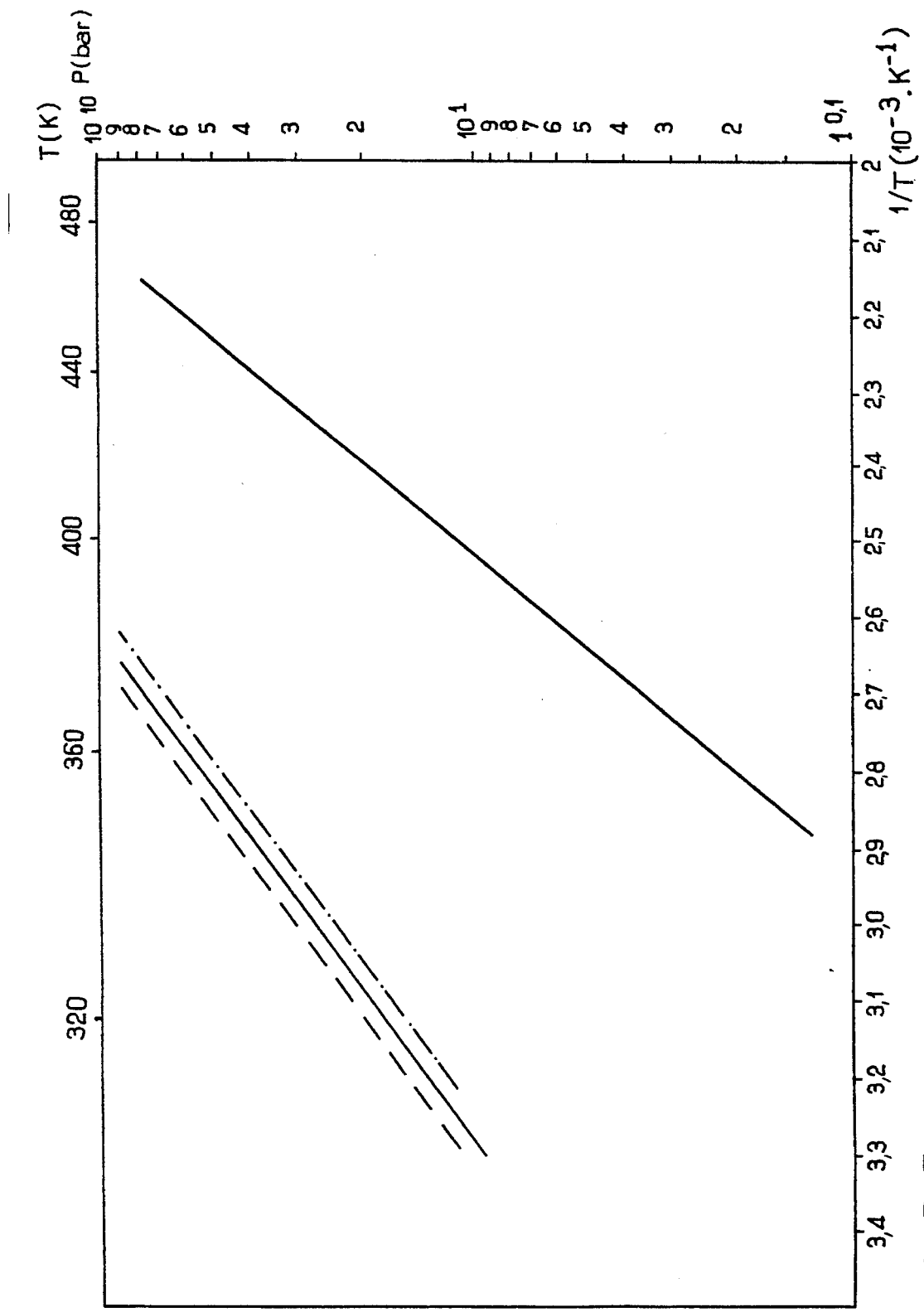
FIG_5

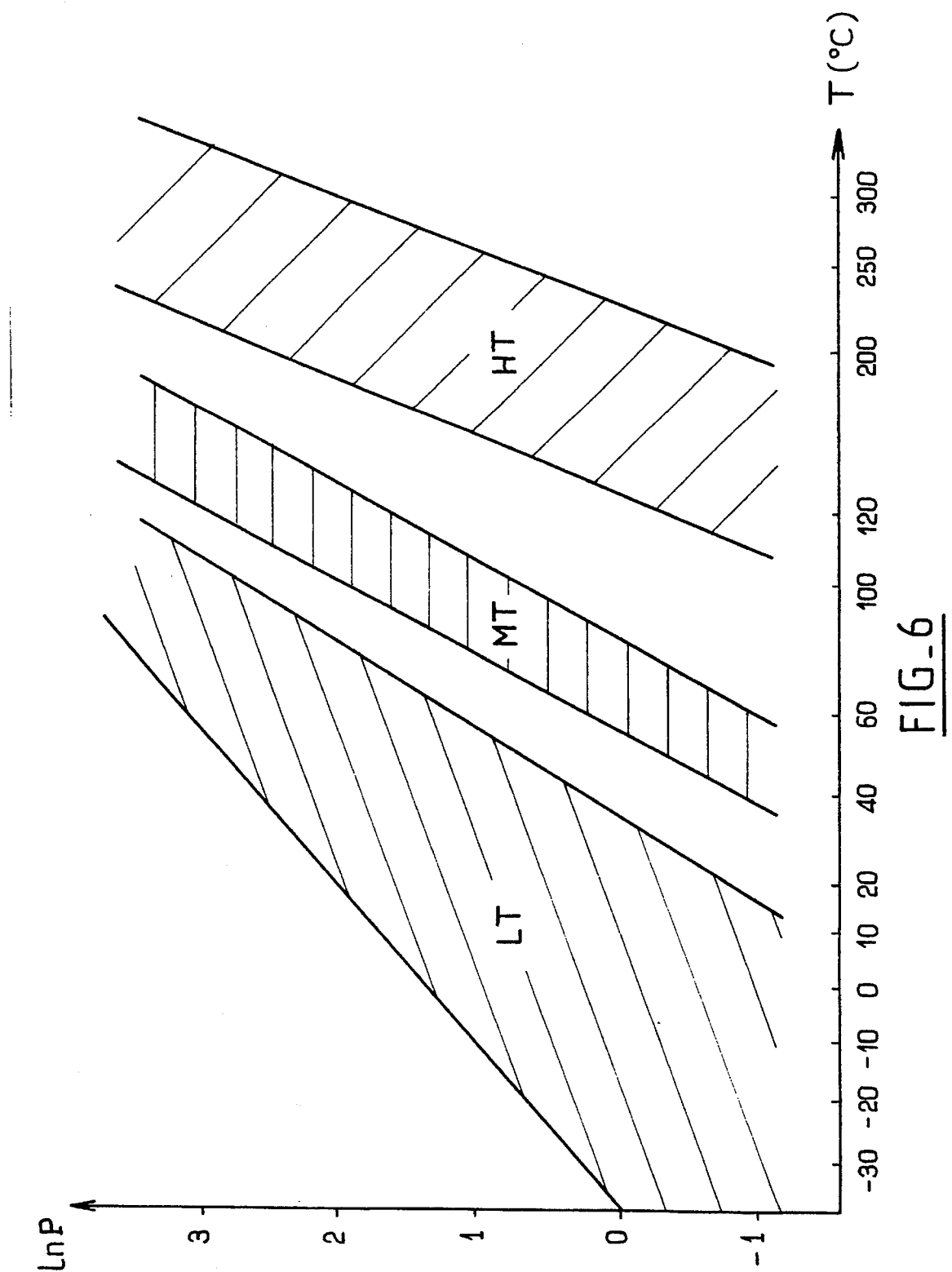
FIG_6

PROCESS FOR USING REACTIONS OF GAS/SOLID TYPE IN WHICH THE SOLID REACTANT CONTAINS AN AT LEAST PARTIALLY HYDRATED SALT

BACKGROUND OF THE INVENTION

Fielf of the Invention

The present invention relates to a process for using gas/solid reactions in which the solid reactant contains an at least partially hydrated salt.

The present invention more particularly relates to a process for using gas/solid chemical reactions which makes it possible to modify the position of the equilibrium line of the reaction under consideration in a Clapeyron diagram and to reduce its slope, in order to cover a wider temperature region for a fairly limited pressure range.

The process targeted by the invention is based on a reversible reaction between a solid and a gas of the type:

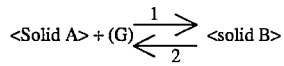

The reaction is exothermic in the 1 direction, which means that in this direction it gives off heat, and endothermic in the 2 direction, that is to say that in this direction it absorbs heat. As it is a true chemical reaction, there is a univariant system at equilibrium, that is to say that there exists a one-to-one relationship between the temperature and the pressure of the form log $P=A-B/T$, in which expression P is the pressure, T the temperature in °K. and A and B are constants characteristic of the salt/gas pair used. Thus, the equilibrium of the solid/gas reaction in question is characterized by a straight line in a Clapeyron diagram. This straight line is known as the equilibrium line of the reaction.

The use of an anhydrous solid reactant is generally reflected by a high slope of the equilibrium line of the reaction in a Clapeyron diagram, which does not make it possible to cover a wide temperature region for a fairly limited pressure range. In particular, the covering of the LT and MT regions mentioned in FIG. 6 for a pressure range from a few mm Hg to several tens of bar is not easy in this scenario.

SUMMARY OF THE INVENTION

The object of the present invention is therefore to overcome this disadvantage by shifting the equilibrium line of the reaction in a Clapeyron diagram and, in particular, by reducing the slope of this straight line, in order to cover a wider temperature region for a limited pressure range, while having many advantages which will become apparent in the course of reading the description.

To do this, the invention proposes a process for using reactions of gas/solid type in which the solid reactant contains a salt, characterized in that the salt is at least partially hydrated.

The choice of the salt and of the gas which take part in this type of reaction depends, inter alia, on the position of the equilibrium line of the reaction. The salt used can be a chloride, a sulphate, a phosphate or any other salt having analogous characteristics.

Production of salts which are not completely dried proves to be less expensive and their use no longer necessitates elevation to the high temperatures necessary for obtaining anhydrous salts. Moreover, many hydrated salts are commercially available.

The hydrates are very soluble in water, which makes it possible to integrate them in procedures relating to reactions of gas/solid type.

The hydrates are particularly suited to the reactions of gas/solid type where the gas is ammonia.

In fact, many analogies exist between the known ammoniates and the corresponding hydrates:

- the temperature ranges corresponding to the existence of the hydrates and ammoniates are virtually super-imposable,
- the energies involved per molecule of water or per molecule of ammonia are of the same order of magnitude:
  11 kcal/mol for $NH_3$
  16 kcal/mol for $H_2O$
- the water and ammonia molecules are similar from the viewpoint of their size and of their polar nature.

In fact, the hydrated salts have a very good reactivity with respect to ammonia.

The hydration level of the solid reactant in the reactor can be adjusted as required and in situ.

The presence of water molecule(s) will modify both the equilibrium pressure value and the $\Delta H$ of the reaction, which has the effect of modifying the slope of the equilibrium line of the reaction in a Clapeyron diagram. Thus, it is, for example, possible to cover a wider temperature range for a given pressure range.

The invention will be explained below using an example, given by way of indication and with no limitation being implied, and with reference to the appended drawings.

BRIEF DESCRIPTION OF THE DRAWINGS

FIG. 3 represents the dehydration thermogram of $MgCl_2 \cdot 6H_2O$ to $MgCl_2 \cdot 2H_2O$;

FIG. 4 represents the thermogram of the reaction of $MgCl_2 \cdot 2H_2O$ saturated at 390 K with an ammonia pressure of 9.03 bar and reveals an absorption peak characteristic of a violent reaction;

FIG. 5 represents the equilibrium lines in a Clapeyron diagram of the reactions with ammonia of the hydroammoniate $MgCl_2 \cdot 2H_2O(5 \leq x)NH_3$ and of the hydroammoniate $MgCl_2 \cdot 2H_2O(x \leq 0)NH_3$ formed from $MgCl_2 \cdot 2H_2O$ and where x is a number strictly between 0 and 5;

FIG. 6 defines the regions known as LT, MT and HT according to the temperature and the pressure.

DETAILED DESCRIPTION OF THE PREFERRED EMBODIMENTS

Figure 1:
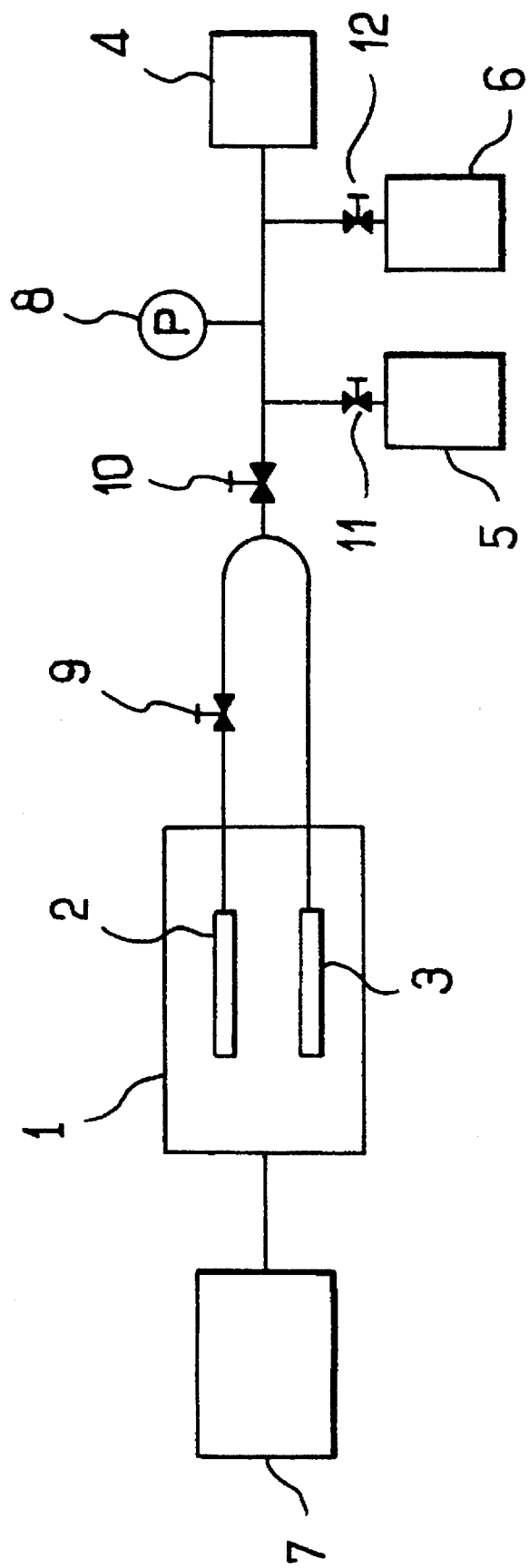
FIG. 1 is a schematic drawing of a device which makes it possible to study the process according to the present invention.

As represented in FIG. 1, the device which makes it possible to use the process on a laboratory scale according to the present invention consists of a differential calorimeter 1 and of two high pressure cells 2, 3 connected to a circuit comprising a gaseous ammonia tank 4, a vacuum pump 5 and an ammonia steel cylinder 6. The differential calorimeter 1 is connected to a chart recorder 7 showing the heat flux given off as a function of the temperature. The ammonia pressure is read using a pressure sensor 8.

In this example, $MgCl_2$ will be used as solid reactant, this salt having hydrates which are stable in the operating temperature range of from 0° to 200° C.

Figure 2:
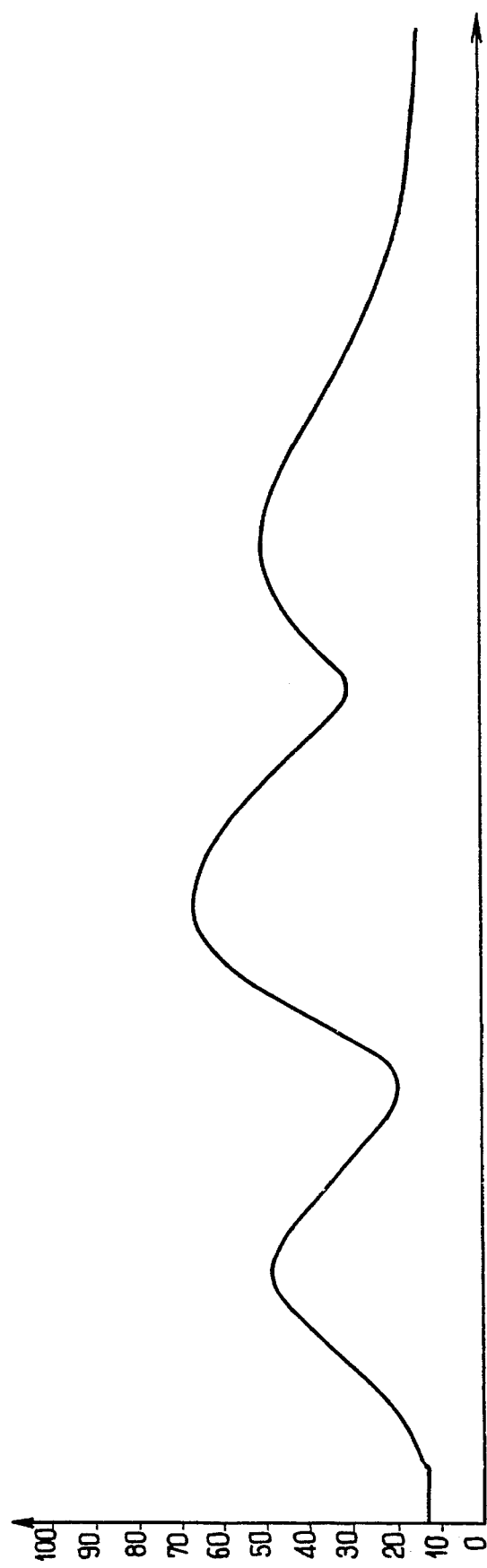
FIG. 2 represents the dehydration thermogram of $MgCl_2 \cdot 6H_2O$ to $MgCl_2 \cdot 1H_2O$, revealing the dehydration in packets of the $MgCl_2 \cdot 6H_2O$.

FIG. 2 shows the dehydration thermogram of $MgCl_2 \cdot 6H_2O$ to $MgCl_2 \cdot 1H_2O$ obtained by the device represented in FIG. 1. This thermogram reveals the dehydration called "in packets" of $MgCl_2 \cdot 6H_2O$ to $MgCl_2 \cdot 1H_2O$. The successive departure of 2, then 2, and then one water molecule is very clearly seen.

From this fact, it is possible to adjust the hydration level of the salt in situ and as required, by using a suitable heating programs.

Thus, in order to obtain $MgCl_2 \cdot 2H_2O$, $MgCl_2 \cdot 6H_2O$ was dehydrated under vacuum according to a heating programs from 300 to 390 K. The thermogram obtained by the device illustrated by FIG. 1 is represented in FIG. 3.

FIG. 4 shows the absorption peak of $NH_3$ by $MgCl_2 \cdot 2H_2O$ characteristic of a violent reaction, when the salt is saturated at 390 K under an ammonia pressure of 9.03 bar.

A temperature sweep from 390 to 300 K was carried out under the same conditions as above, during which a second absorption was produced. This implies the presence of two equilibrium lines characteristic of this hydroammoniate.

FIG. 5 shows the two equilibrium lines of the reactions of the hydroammoniates formed from $MgCl_2$ dihydrate, obtained using the device described in FIG. 1 and according to the procedure with the following stages:
1) placing the cell at a set temperature,
2) desorption under vacuum,
3) placing under high $NH_3$ pressure (greater than the estimated equilibrium pressure),
4) complete recording of the absorption peak,
5) desorption under vacuum,
6) repeating Stages 3 to 5 with increasingly lower $NH_3$ pressures, until the absorption phenomenon has disappeared.

Another procedure which would consist in a temperature sweep at set ammonia pressures gives less accurate results.

The equilibrium lines represented in FIG. 5 make it possible to determine a mean reaction enthalpy value, which gives for each straight line:

$\Delta H_{mean}$ [$MgCl_2 \cdot 2H_2O(5 \leftrightarrows x)NH_3$]=6.707 kcal/mol $\Delta H_{mean}$ [$MgCl_2 \cdot 2H_2O(x \leftrightarrows 0)NH_3$]=11.183 kcal/mol x is strictly between 0 and 5.

It is observed that the equilibrium line $MgCl_2 \cdot 2H_2O(5 \leftrightarrows x)NH_3$ occupies an advantageous position due to its low slope since it crosses the LT and MT regions defined in FIG. 6.

Moreover, it is spread over a wide temperature range for a fairly limited pressure range.

The process of the invention is particularly well suited to the carrying out of reversible gas/solid reactions used in cycles such as those which are employed for the chemical storage of energy or thermochemical heat pumps.

The process is also very well suited to a process for using gas/solid reactions in which expanded graphite would be added to the reaction medium.

We claim:

1. Process for producing heating or cooling comprising conducting a reversible chemical reaction between a gas and a solid reactant of the type:

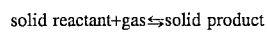

solid reactant+gas⇌solid product to produce heat and conducting the reverse of this chemical reaction to absorb heat, thereby producing cooling, wherein said solid reactant contains a salt which is at least partially hydrated.

2. Process according to claim 1, wherein the salt is completely hydrated.

3. Process according to claim 1, wherein the salt is a chloride.

4. Process according to claim 3, wherein the salt is $MgCl_2$.

5. Process according to claim 4, wherein the salt is $MgCl_2 \cdot nH_2O$ where n has a value of 1, 2, 4 or 6.

6. Process according to claim 1, wherein the salt is a sulphate.

7. Process according to claim 1, wherein the salt is a phosphate.

8. Process according to claim 1, wherein the gas is ammonia.

9. Process according to claim 1, wherein the hydration level of the salt is adjusted in situ by application of heat.

* * * * *